Dec. 1, 1959 L. SHAPIRO 2,915,582

DYNAMIC CONTROL CIRCUIT FOR CATHODE RAY TUBES

Filed March 27, 1956 2 Sheets-Sheet 1

INVENTOR.
Louis Shapiro
BY
Morris Rabkin
ATTORNEY.

DYNAMIC CONTROL CIRCUIT FOR CATHODE RAY TUBES

Filed March 27, 1956 2 Sheets-Sheet 2

INVENTOR.
Louis Shapiro
BY
Morris ... Rabkin
ATTORNEY.

2,915,582

DYNAMIC CONTROL CIRCUIT FOR CATHODE RAY TUBES

Louis Shapiro, Erlton, N.J., assignor to Radio Corporation of America, a corporation of Delaware Application March 27, 1956, Serial No. 574,185

6 Claims. (Cl. 178—7.2)

This invention relates to protective circuits for cathode ray tubes, and particularly to a system for providing a dynamic control over the current in such tubes.

This invention may be used in cathode ray tube systems, for example, of the type described in an article "Photographic and Photomechanical Aspects of Electronic Color Correction" by Rydz et al. in The Proceedings of the Sixth Annual Technical Meeting of the Technical Association of the Graphic Arts, 1954, page 139. In a scanning system of the type there described, a cathode ray tube is used as a flying spot scanner to scan a plurality of photographic transparencies. The article also describes a recording system of the type using a cathode ray tube as an image reproducer, in which the light intensity is modulated in accordance with a video signal.

The resolution afforded by such systems is made an optimum by providing a maximum number of available picture elements for a given aspect ratio. The available resolution is optimized with a scanning raster whose area is at least equal to the area of the picture to be scanned and whose diagonal is substantially equal to the usable diameter of the circular scanning tube face plate. In systems of the aforementioned type, it is necessary to provide additional information around the picture to be scanned or reproduced. Such information may take the form of registration marks, a gray scale, and test patches exhibiting spectral and other characteristics of printing inks to be used in reproducing the picture. Generally, a rectangular scanning raster that is large enough to scan these border areas has a diagonal that is longer than the diameter of the tube face plate. Consequently, the corners of this rectangular raster extend beyond this face plate, at which corners the scanning light spot is not produced. This condition together with another feature of the aforementioned cathode ray tube systems tends to produce an undesirable effect.

The intensity of the scanning light spot is not linear with driving voltages or with deflection geometry. To compensate for this non-linearity as well as for optical non-linearities, it is desirable to provide a feedback loop. This feedback loop includes photoelectric means for measuring the light spot intensity, and means for varying and correcting the driving voltage in accordance with any deviation of this measured intensity from a required intensity.

This feedback loop tends to increase the cathode current of the tube whenever the scanning light is spuriously extinguished as, for example, when the beam of the tube is deflected off of the face plate in the aforementioned manner. When the light spot is extinguished, the feedback loop operates to restore the light intensity to some finite required value by increasing the drive on the cathode ray tube. As a result, the cathode current of the tube tends to increase to excessive values, at which protective relay circuits may operate to disconnect or shut down the power supply and terminate operation of the system. Such disruption may make the completed portion of the scanning or reproducing operations unusable, and is costly in time lost.

Though the protective relay circuits may not be operated by these surges in cathode current when the light spot is extinguished, these surges do tend to produce a momentary loss in regulation in the high-voltage power supply from which this current is drawn. Any small failure in the regulation of this supply may be sufficient to produce substantial variations in beam focussing and beam deflection and, therefore, in the raster developed by the cathode ray tube. It has been found that these focussing and deflection variations markedly impair the quality of the scanning and reproducing operations.

It is among the objects of this invention to provide:

A new and improved cathode ray tube system in which deleterious surges in tube cathode current are prevented;

A new and improved protective system for cathode ray tubes.

In accordance with this invention a cathode ray tube system is provided that comprises a feedback loop. This loop includes a means that is responsive to the intensity of the light spot from the tube for feeding signals to vary the drive voltages applied to the tube. A means is provided for isolating the feedback means from control of the drive voltages when the feedback signals tend to produce an excessive cathode current. At the same time, this isolating means also feeds signals to maintain the drive voltage at a suitable operating value.

The foregoing and other objects, the advantages and novel features of this invention, as well as the invention itself both as to its organization and mode of operation, may be best understood from the following description when read in connection with the accompanying drawings, in which like reference numerals refer to like parts, and in which.

Figure 1:
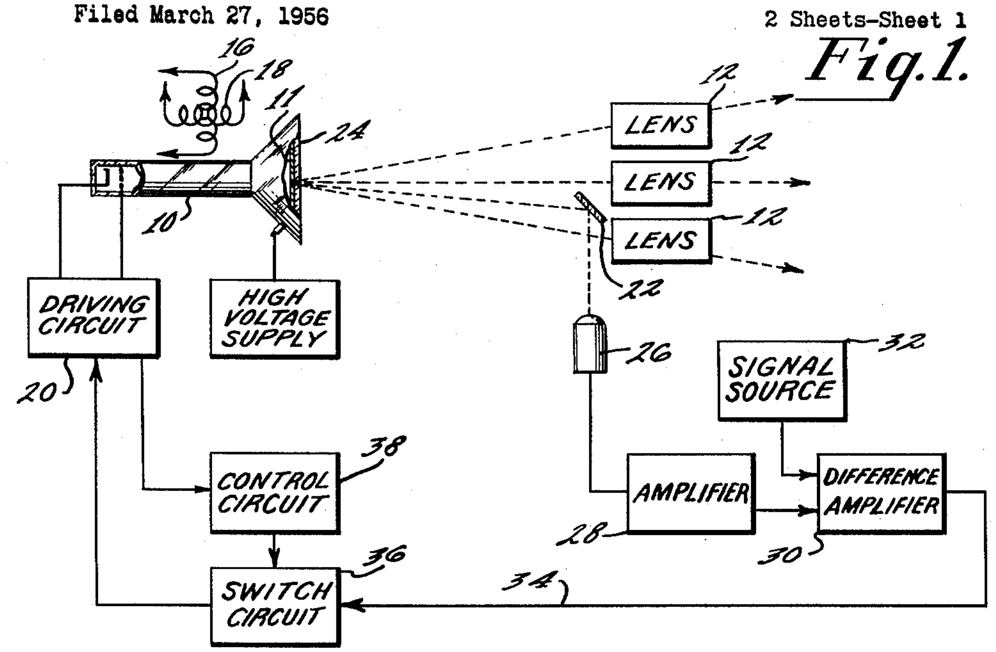
Figure 1 is a block diagram of a cathode ray tube system embodying this invention.

In Figure 1, a cathode ray tube system embodying this invention is shown employed with a scanning arrangement of the type described in the above cited article. A flying spot kinescope tube 10 provides a moving spot of light at a phosphor screen 11, which spot is imaged through separate optical paths. Each of these optical paths is shown, by way of example, to include a separate lens system 12. These lenses 12 image the light spot produced by the kinescope 10 onto separate photographic transparencies, which may be like a photograph 14 shown in Figure 2. The kinescope 10, the lenses and other optical elements are mounted in an appropriate light tight housing (not shown). The kinescope 10 has vertical and horizontal deflection coils 16 and 18, respectively, which are energized by appropriate deflection circuits (not shown), and also has a focussing system (not shown). The kinescope 10 may be of the type described in an article in "Electronics" of June 1948, at page 124, entitled, "The Flying Spot Video Generator."

The grid to cathode voltage of the kinescope 10 is controlled by a driving circuit 20. This voltage determines the magnitude of the cathode current of the kinescope, which cathode current, in effect, determines the beam current and, thereby, the intensity of the light spot produced at the phosphor screen 11 of the kinescope.

The cathode current of the kinescope 10 measured, for example, in circuit 20, also controls the switch circuit 36. A mirror 22 in front of the kinescope face plate 24 samples the intensity of the light spot by reflecting light from the face plate 24 of the tube 10 to a photocell 26. The output of the photocell 26 is supplied by way of an amplifier 28 to one input of a difference amplifier 30. A signal source 32 supplies a signal in accordance with a required light spot intensity to the other input of the difference amplifier 30. In a scanning system requiring a light spot of constant intensity, the signal source 32 supplies an appropriate constant magnitude master signal to the difference amplifier 30. The difference amplifier 30 produces as an output an error signal which is proportional to the difference between the light intensity measured by the photocell 26 and the light intensity called for by the signal from the source 32. This error signal is fed by way of a circuit 34 through a switch circuit 36 to the driving circuit 20. The error signal produces a variation in the driving voltages supplied to the kinescope 10 to change the light intensity to a value equal to that called for by the signal source 32. The switch circuit 36 is actuated by a control circuit 38. This control circuit 38 may take different forms, as described below, and operates to disconnect the feedback circuit 34 from the driving circuit 20 and also to supply a signal to the driving circuit 20 to maintain the cathode current of the kinescope 10 below excessive values.

Figures 2, 4:
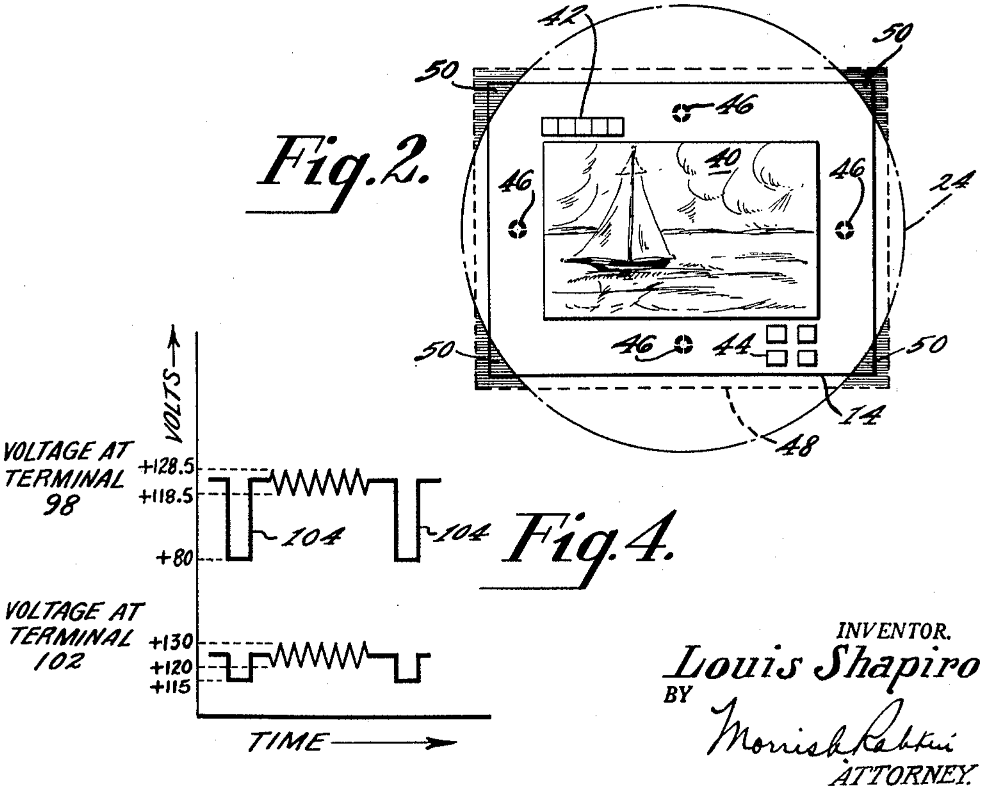
Figure 2 is a view of a photograph that may be scanned with the system of Figure 1 and shows the relationship of that photograph to the face plate of the cathode ray tube in this system, the face plate being imaged on the photograph.
Figure 4 is a graph of waveforms that may occur at terminals of the circuit of Figure 3, these waveforms being exaggerated and idealized to illustrate the operation of this circuit.

In Figure 2, there is shown a rectangular photographic transparency 14 that may be scanned with the system of Figure 1, as noted above. Within the borders of this photograph 14, is a rectangular picture area 40. Around the border of the picture area 40, there may be gray scale areas 42 and color patches 44, which provide the basis for a number of tests to be performed in the scanning system noted above. Other information that may be added outside of the picture area 40 includes, for example, registration marks 46, by means of which images of a plurality of such photographs may be registered.

The circular face plate 24 of the kinescope 10 is shown imaged on this photograph 14 to illustrate the relative sizes of this photograph and the imaged raster. The diagonal of the picture area 40 is made as large as possible compared to the imaged diameter of the face plate 24 in order to optimize the extent to which the available resolution of the kinescope 10 is used. Generally, due to manufacturing methods, a narrow portion around the rim of the face plate 24 has distortions that prevent this portion from being used for scanning. Thus, the diagonal of the maximum picture area is somewhat smaller than the imaged diameter of the face plate 24. A rectangular raster that encompasses the border information around the picture area 40 is shown in broken lines and referenced by the numeral 48. At the corners 50 (shown by hatching) of this raster area 48, the beam of the tube 10 is deflected from striking the phosphor plane 11 on the inner surface of the face plate 24. At these corners 50, therefore, the light spot is extinguished.

Over all of the kinescope raster 48, the intensity of the light spot is measured by the photocell 26 and compared electrically in the difference amplifier 30 with the light intensity called for by the signal source 32. If there are any deviations of the measured light intensity from the required intensity, the difference amplifier 30 feeds an error signal to the driving circuit 20 to adjust the driving voltages in a direction to eliminate such deviation. This feedback operation takes place over all of the raster 48, except the aforementioned corners 50. At these corners 50, the light spot is extinguished. The resulting error signal from the difference amplifier 30 tends to produce an increase in the cathode current of the kinescope 10. Since the light spot remains extinguished during the corner portion 50 of the raster 48, the feedback circuit tends to increase the drive on the kinescope to excessive values. The control circuit 38 detects the condition in which excessive kinescope currents tend to be produced, and operates the switch circuit 36 to disconnect or isolate the feedback circuit 34 from the driving circuit 20. Thereby, the tendency to increase the kinescope currents to excessive values is prevented. At the same time, the control circuit 38 supplies a signal to the driving circuit 20, which signal tends to maintain the drive applied to the kinescope at a value reasonably close to that ordinarily called for by the signal source 32. When the light spot moves out of the corner portions 50 and is no longer extinguished, the control circuit 38 operates to restore the connection of the feedback circuit 34 to the driving circuit 20. In this way, the kinescope 10 and the feedback circuit are quickly restored to a condition to provide the light output called for by the signal source 32.

The system of Figure 1 may also be used with an arrangement of the type described in the above cited article in which the kinescope 10 is used to reproduce an image in accordance with a varying video signal supplied by the signal source 32. As an image reproducing system, the operation is similar to that described above.

Figure 3:
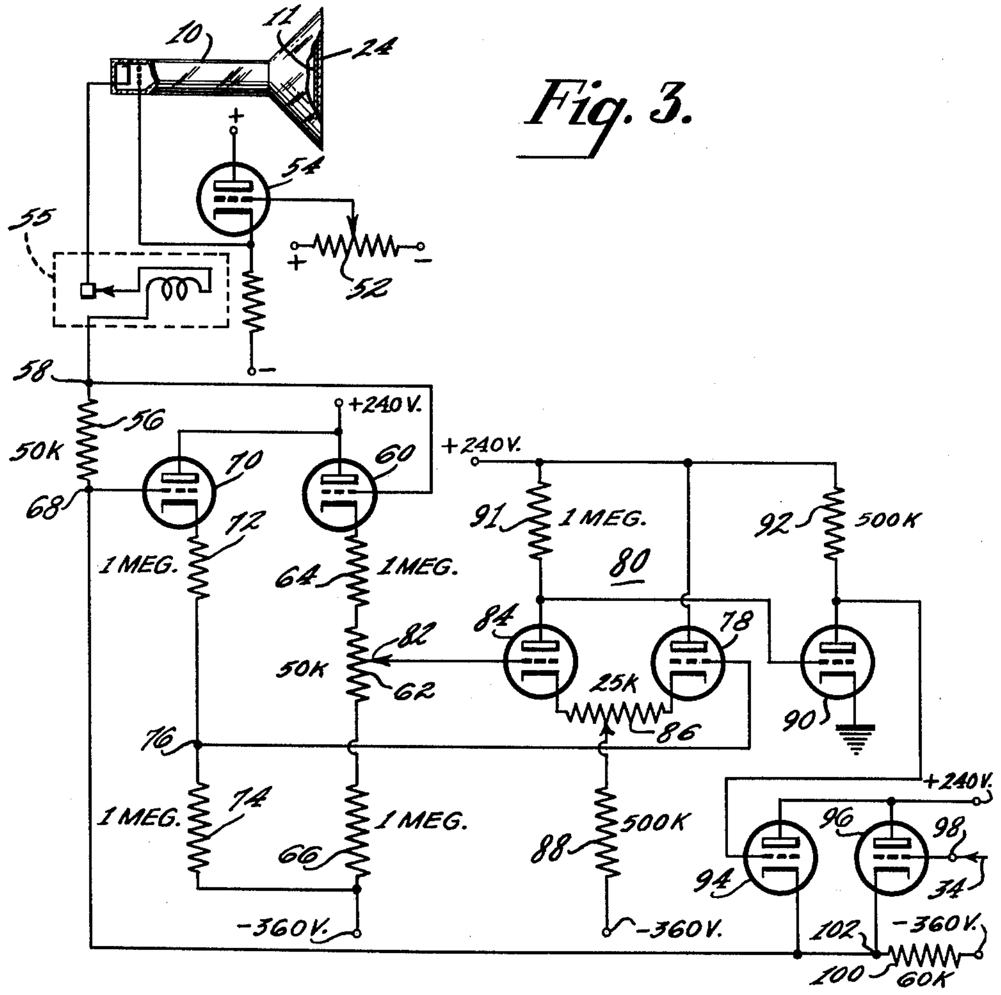
Figure 3 is a schematic circuit diagram of an embodiment of this invention.

In Figure 3, there is shown a schematic circuit diagram of switch and control circuits that may be used in the system of Figure 1. A suitable constant bias voltage from a potentiometer 52 is applied to the grid of the kinescope 10 through a cathode follower circuit 54. A resistor 56 is connected in the cathode circuit of the kinescope 10. A protective meter relay circuit 55 is connected between the resistor 56 and the kinescope cathode. The switch of this relay 55 is opened when the relay is energized by excessive currents and requires manual reset. The high voltage terminal 58 of this cathode resistor 56 is connected to the grid of a cathode follower 60. This cathode follower 60 has a cathode impedance made up of the series combination of a resistor 62 with an adjustable tap 82 and resistors 64, 66 on either end of the resistor 62. The low voltage terminal 68 of the resistor 56 is connected to a second cathode follower 70, whose cathode resistance is made up of two fixed resistors 72, 74. The junction 76 of the resistors 72, 74 is connected to the grid of one tube 78 of a difference amplifier circuit 80. The adjustable tap 82 of the resistor 62 is connected to the grid of the other tube 84 of the difference amplifier 80. An adjustable balancing resistor 86 is connected between the cathodes of the difference amplifier tubes 78, 84; and a common cathode resistor 88 is connected to the tap of this resistor 86. A load resistor 90 is connected between a positive direct-voltage supply terminal and the anode of the tube 84. The anode of this tube 84 is connected to the grid of an amplifier tube 90, to which is connected an anode load resistor 92. The anode of this amplifier 90 is connected to the grid of a first switch tube 94. The grid of a second switch tube 96 is connected to the terminal 98 to receive the error signal from the feedback circuit 34. A common cathode resistor 100 is connected to the cathodes of the switch tubes 94, 96. The terminal 102 at the cathodes of these tubes 94, 96 is connected to the low voltage terminal 68 of the resistor 56. Suitable power supplies may be provided for the tube circuits in the manner shown in Figure 3.

The general operation of the circuits of Figure 3 is summarized first, and then the detailed operation is described.

The cathode current circuit of the kinescope 10 is through the resistor 56 and the common cathode resistor 100 to a negative power supply terminal. The voltages at the terminals 58, 68 of the resistor 56 are monitored by the cathode follower circuits 60, 70. The difference amplifier 80 provides an output which is a measure of a voltage drop across the resistor 56 and, therefore, a measure of the cathode current in the kinescope 10. The output of the difference amplifier 80 is amplified and used to control the operation of the first switch tube 94. The second switch tube 96 receives the amplified error signal from the feedback circuit 34, and operates as a cathode follower, when it is conducting, to control the kinescope drive voltage in accordance with the error signal. When the cathode current of the kinescope is not in excess of a range that is set by the adjustment of the resistor 62, the grid voltage of the first switch tube 94 is far below cut-off potential; and this tube 94 does not affect the operation of the second switch tube 96 as a cathode follower. However, when the cathode current of the kinescope starts to increase beyond the abovementioned proper range, due to, for example, a large negative-going change in the error signal voltage level at the feedback circuit 34, the difference amplifier 80 and the amplifier 90 operate to raise substantially the voltage applied to the grid of the first switch tube 94. The cathode voltage of this tube 94 increases corerspondingly, and cuts off the tube 96 to disconnect the feedback circuit 34 from the kinescope cathode. Thereby, the voltage at the cathode terminal 102 is maintained at a suitable level and the kinescope cathode current does not become excessive.

Shown in Figure 4 is a graph of the voltage waveform supplied to the grid terminal 98 of the second switch tube 96 by the feedback circuit 34. This error signal waveform, which is exaggerated for presentation purposes, shows two large voltage drops 104 corresponding to the raster corners 50 at which there is extinction of the light spot at the face plate 24 of the kinescope 10. The lower limit of the error signal voltage is the extreme output of the difference amplifier 30 operating in a saturated condition resulting from the spurious signal. Between these two extreme voltage drops 104 there is a varying waveform, which may be that of a video signal when the kinescope 10 is used as an image reproducer in a system of the type noted above. For the circuit parameters shown in Figure 3, presented to illustrate an operative embodiment of the invention, the voltage variation at the feedback circuit 34 over the video signal range may be of the order of 10 volts for normal raster positions of the light spot. However, when the light spot is extinguished due to beam deflection off the face plate 24, the voltage drop at the feedback circuit 34 may be of the order of another 40 volts. An increase in cathode current corresponding to such a 40 volt drop would tend to throw the high voltage kinescope supply out of regulation momentarily and possibly injure the kinescope 10.

Over the range of kinescope drive that corresponds to the 10 volt signal range, the kinescope cathode current may vary from a small fraction of a microampere to a maximum value of approximately 20 microamperes. Generally, there is some finite light intensity (and corresponding cathode current value) that is the "black" level of image reproduction; thus, total light extinction would be outside the signal range. The voltage developed across the cathode resistor 56, of 50,000 ohms, changes 0.05 volt per microampere of cathode current. The setting of the adjustable cathode resistor 62 is such as to provide a voltage at the adjustable tap 82 which is approximately 0.25 volt below the junction 76 of the cathode resistors for grid voltages of the cathode followers 60, 70 corresponding to 20 microamperes of current through the resistor 56. Therefore, at a kinescope cathode current of approximately 30 microamperes the voltage at the tap 82 is equal to that at the junction 76 (the resistors 72, 74 and 64, 66 producing a gain factor of ½). During normal signal operation in which there is no more than 20 microamperes of cathode current, the grid of the difference amplifier tube 84 is at least 0.25 volt negative with respect to the grid of the other tube 78. This small voltage difference is amplified to a substantial positive voltage with respect to ground or zero potential at the anode of the tube 84, which anode voltage is the grid voltage of the tube 90. Consequently, the amplifier tube 90 conducts heavily under conditions of saturation. The anode of the amplifier tube 90 and, thus, the grid of the first switch tube 94 are close to ground potential under these conditions. Accordingly, the first switch tube 94 is biased far below cut off potential during normal operation. The second switch tube 96 operates as a cathode follower and supplies the kinescope drive voltage in accordance with the error signal voltage from the feedback circuit 34.

When the beam of the kinescope 10 is deflected to one of the corners 50 of the raster 48, extinguishing the light spot, the signal voltage drops sharply to a voltage shown as 80 volts in Figure 4. As the voltage at the cathode terminal 102 falls, the kinescope cathode current increases. When the kinescope cathode current increases to approximately 30 microamperes, the voltage change of 0.5 volt across the resistor 56 is sufficient to make the grid voltage of the difference amplifier tube 84 equal to that of the other tube 78. There follows a substantial reduction in voltage at the anode of the tube 84 as it assumes a condition of operation with its anode slightly below ground. As the grid of the amplifier tube 90 becomes negatively biased, a condition corresponding to approximately the last microampere increase in kinescope cathode current, the current flow in that tube 90 is reduced substantially from its previously saturated state to a condition of linear operation. There is a large rise in voltage at the anode of this tube 90 and, therefore, at the grid of the first switch tube 94. This voltage rise is such (of the order of 100 volts for the parameters indicated) that this first switch tube 94 is rendered conductive, and the cathode terminal held at approximately 115 volts. At this time, the grid of the second switch tube 96 has a large negative bias, and this tube 96 is cut off. Thus, in the interval that the light spot on the kinescope face plate 24 is extinguished, the feedback circuit 34 is disconnected from the kinescope cathode and cannot affect the drive voltages. Instead, a second feedback loop measures the kinescope cathode current by means of the circuits 60, 70, and 80, and controls the kinescope drive. This control is through an effective cathode follower provided by the switch tube 94, and prevents an increase in kinescope cathode current above a suitable value that is set by adjustment of the resistor tap 82.

When the kinescope beam is deflected back to the face plate 24, the voltage supplied by the feedback circuit 34 to the terminal 98 of the second switch tube 96 increases to a value within the signal range shown in Figure 4. The kinescope cathode current is then reduced below the switching value of about 30 microamperes, the difference amplifier 80 returns to the normal condition, and the tube 90 conducts heavily at saturation. The first switch tube 94 is then cut off, and the second switch tube 96 operates as a cathode follower to drive again the kinescope cathode in accordance with the signal-derived error voltage from the feedback circuit 34.

The cathode follower circuits 60, 70 and the difference amplifier 80 provide a sensitive and accurate measure of changes in kinescope cathode current. This measure of current is substantially unaffected by voltage level drifts at the kinescope cathode over extended periods of use. These voltage drifts, which are apparently largely due to a thermal effect on the tube structure, may be quite large without an unbalancing effect on the difference amplifier output. The cathode followers 60 and 70, difference amplifier 80, and the amplifier 90 together are capable of a gain of about 2,000. Thus, these circuits 60, 70, 80, and 90 can furnish a swing of 100 volts for the switch tube 94 from a 0.05 volt change across the resistor 56. Thus, the switch tube 94 can be made to operate if there is but one microampere increase in kinescope cathode current, say from 20 to 21 microamperes. In a circuit having the parameters indicated in Figure 3, the tube types employed were one-half of a 12AX7 for each of the tubes 60, 70, 78, and 84, and one-half of a 12AT7 for each of the tubes 92, 94, and 96.

The protective relay circuit 55 may be set to operate at about 50 microamperes. When so operated, the relay 55 may be used in a conventional manner to shut down or disconnect one or more of the power supply circuits as well as open the cathode circuit in the manner indicated. Such operation of the relay 55 may result in costly time and work losses. Therefore, it is desirable that this relay 55 be operated only when necessary at dangerously high current levels. The system of Figure 3 permits the cathode ray tube to be operated over cathode current ranges that may come quite close to the relay operating level and for extended time periods without disruption of the power supplies or of special resetting operations.

Figure 5:
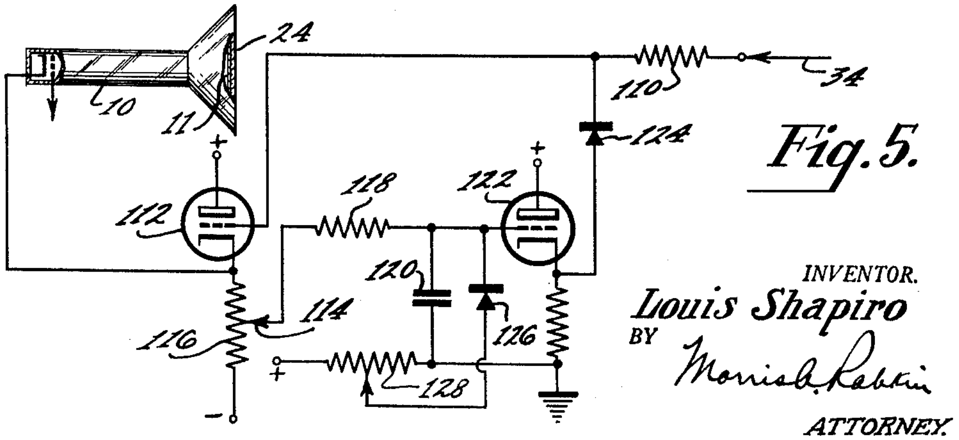
Figure 5 is a schematic circuit diagram of another embodiment of this invention.

In Figure 5, a schematic circuit diagram of another embodiment of this invention is shown. Parts corresponding to those previously described are referenced by the same numerals. The error voltage at the feedback circuit 34 is applied through an isolating resistor 110 to the grid of a cathode follower 112. The kinescope cathode is driven by this cathode follower 112 in accordance with the voltage applied to the cathode follower grid. An adjustable tap 114 on the cathode resistor 116 of this cathode follower is connected through the series combination of a resistor 118 and a capacitor 120 to ground. The voltage across the capacitor 120 is applied to the grid of another cathode follower 122. The cathode of the cathode follower 122 is connected through a diode 124 to the grid of the cathode follower 112. A second diode 126 is connected between the grid of the cathode follower 122 and the adjustable tap of a potentiometer 128. This second diode 126 is connected in such polarity as to clamp the grid voltage of the cathode follower 122 at a suitable positive potential.

When the error voltage supplied by the feedback circuit 34 is in the normal signal range, the cathode follower 112 operates to drive the kinescope cathode in accordance with this error voltage. The capacitor 120 is charged, during this interval, to substantially the voltage at the tap 114 of the cathode resistor 116. The series combination of the resistor 118 and capacitor 120 operates as an integrating or averaging circuit that has a time constant which may be of the order of several cycles of the horizontal deflection. The voltage at the adjustable tap 114 of the cathode resistor 116 is stepped down to provide a voltage level that is below that corresponding to the lowest possible feedback voltage within the signal range. Thus, during normal scanning with the kinescope beam on the face plate 24, the voltage across the capacitor 120 is substantially below the voltage applied to the grid of the cathode follower 112 (neglecting the small grid-cathode tube biases). The cathode voltage of the cathode follower 122 is substantially the same as the voltage across the capacitor 120, and, therefore, less than the grid voltage of the tube 112. Consequently, during normal kinescope operation, the diode 124 is non-conducting and the capacitor voltage is proportional to the kinescope drive voltage averaged over the time constant of the integrating circuit. When the kinescope light spot is momentarily extinguished, the voltage at the feedback circuit 34 falls substantially below the signal range, and, thus, below the voltage across the capacitor 120. The diode 124 conducts then to supply the cathode follower 112 with substantially the capacitor voltage to maintain the level of the kinescope drive voltage. During this time interval, the grid of the cathode follower 112 is positive with respect to the voltage at the feedback circuit 34, so that this feedback circuit 34 is isolated from the kinescope cathode. When the normal raster condition is restored, the voltage at the feedback circuit 34 is returned to the signal range. This feedback circuit voltage is substantially more positive than the capacitor voltage 120. Therefore, the diode 124 is blocked, and the feedback circuit 34 controls the kinescope drive.

The capacitor 120 discharges during periods of extinction of the kinescope light spot. If such light extinction should continue for an extended period, the diode 126 and potentiometer 128 function as a direct voltage clamp for the grid of the cathode follower 122. Thereby, a minimum positive voltage is furnished to the grid of the cathode follower 122 and, in turn, to the grid of the cathode follower 112. Thus, a minimum value of kinescope cathode current is assured even though the kinescope light spot is extinguished for extended periods.

In accordance with this invention, an improved cathode ray tube system is provided. Surges of cathode current in the cathode ray tube are prevented, so that injury to the tube or faulty operation of the system is prevented.

What is claimed is:

1. An electronic system for providing a moving light spot comprising a cathode ray tube; means for applying signals to said tube to produce a deflection of the light spot of said tube; means for controlling the cathode current of said tube and thereby the intensity of said light spot; a feedback circuit including means to receive master signals, light-sensitive means responsive to light from said light spot for deriving light signals, and difference circuit means for taking the difference between said master signals and said light signals for deriving a feedback signal to apply to said controlling means for varying said cathode current in accordance with said feedback signal; means for detecting said cathode current; and switch means interposed in said feedback circuit and connected to be controlled by said detecting means for disconnecting said feedback circuit from said controlling means in response to said cathode current exceeding a selected value of current.

2. An electronic system for providing a moving light spot comprising a cathode ray tube; means for applying signals to said tube to produce a deflection of the light spot of said tube; means for controlling the cathode current of said tube and thereby the intensity of said light spot; feedback means including means to receive master signals, light-sensitive means responsive to light from said light spot for deriving light signals, and difference circuit means for taking the difference between said master signals and said light signals for deriving a feedback signal to apply to said controlling means for varying said cathode current in accordance with said feedback signal; means for detecting said cathode current; and a switching circuit connected between said feedback means and said controlling means to be controlled by said detecting means for disconnecting said feedback means from said controlling means in response to said cathode current exceeding a selected value of amplitude.

3. An electronic system for providing a moving light spot comprising a cathode ray tube; means for applying signals to said tube to produce deflection of the light spot of said tube; means for controlling the cathode current of said tube and thereby the intensity of said light spot; a first feedback circuit including means to receive master signals, light-sensitive means responsive to light from said light spot for deriving light signals, and difference circuit means for taking the difference between said master signals and said light signals for deriving a feedback signal to apply to said controlling means for varying said cathode current in accordance with said feedback signal; and a second feedback circuit including means responsive to said cathode current and a switch circuit interposed in said first feedback circuit, said switch circuit being responsive to cathode current in excess of a selected value of cathode current to actuate said switch to disconnect said feedback signal from said controlling means and for connecting a selected, fixed signal to said controlling means.

4. A cathode ray tube scanning system for scanning a photograph comprising means for producing a moving light spot to scan a subject; said light spot producing means including a cathode ray tube having a light producing screen, deflecting means for deflecting said spot, means for applying deflection signals to said deflecting means to produce deflection of the beam of said tube in a raster across said screen, and means for controlling the cathode current of said tube and thereby the intensity of said light spot; means for imaging said light spot at said photograph; said tube and said deflection signal applying means being arranged to produce a deflection of said beam off said screen at certain portions thereof to provide a light spot raster whose image at said photograph is at least as great as the area of the photograph to be scanned; a feedback path including a photo-cell means exposed to and responsive to said light spot intensity means for deriving light signals, means to receive master signals, and difference circuit means for taking the difference between said master signals and said light signals for deriving a feedback signal to be applied to said cathode current controlling means; means for deriving a signal proportional to said cathode current; a control circuit for deriving a control signal depending on the comparison of said cathode current signal and a selected value signal; and a switch circuit interposed in said feedback path and connected to respond to said control signal to disconnect said feedback signal when said cathode current signal exceeds said selected value signal from said cathode current controlling means, whereby said feedback signal is disconnected when said beam is deflected off said screen.

5. A cathode ray tube scanning system for scanning a photograph comprising means for producing a moving light spot to scan a subject, said light spot producing means including a cathode ray tube having a light producing screen, deflecting means for deflecting said spot, means for applying deflection signals to said deflecting means to produce deflection of the beam of said tube in a raster across said screen, and means for controlling the cathode current of said tube and thereby the intensity of said light spot; means for imaging said light spot at said photograph, said tube and said deflection signal applying means being arranged to produce a deflection of said beam off said screen at certain portions thereof to provide a light spot raster whose image at said photograph is at least as great as the area of the photograph to be scanned; a feedback path including a photo-cell means exposed to and responsive to said light spot intensity means for deriving light signals, means to receive master signals, and difference circuit means for taking the difference between said master signals and said light signals for deriving a feedback signal to be applied to said cathode current controlling means; means for deriving a signal proportional to said cathode current; a control circuit for deriving a control signal depending on the comparison of said cathode current signal and a selected value signal; and a switch having one portion interposed in said feedback path and connected to respond to said control signal to disconnect said feedback signal from said cathode current controlling means, whereby said feedback signal is disconnected when said beam is deflected off said screen, said switch circuit having another portion connected to apply a selected voltage to said controlling means when said feedback signal is thus disconnected.

6. A cathode ray tube scanning system for scanning a photograph comprising means for producing a moving light spot to scan a subject; said light spot producing means including a cathode ray tube having a light producing screen, deflecting means for deflecting said spot, means for applying deflection signals to said deflecting means to produce deflection of the beam of said tube in a raster across said screen, and means for controlling the cathode current of said tube and thereby the intensity of said light spot; means for imaging said light spot at said photograph; said tube and said deflection signal applying means being arranged to produce a deflection of said beam off said screen at certain portions thereof to provide a light spot raster whose image at said photograph is at least as great as the area of the photograph to be scanned; a feedback path including a photocell means exposed to and responsive to said light spot intensity means for deriving light signals, means to receive master signals, and difference circuit means for taking the difference between said master signals and said light signals for deriving a feedback signal to be applied to said cathode current controlling means; means for deriving a signal proportional to said cathode current; a control circuit for deriving from said cathode current signal a control voltage proportional to the average of said cathode current; and a switch circuit interposed in said feedback path and connected to respond to said control signal to disconnect said feedback signal when said feedback signal is less than said control voltage from said cathode current controlling means, whereby said feedback signal is disconnected when said beam is deflected off said screen.

References Cited in the file of this patent

UNITED STATES PATENTS

| | | |
|---|---|---|
| 2,084,700 | Ogloblinsky | June 22, 1937 |
| 2,188,679 | Dovaston et al. | Jan. 30, 1940 |
| 2,804,550 | Artzt | Aug. 27, 1957 |